United States Patent
Hiramine et al.

(10) Patent No.: US 7,164,362 B2
(45) Date of Patent: Jan. 16, 2007

(54) APPARATUS FOR DRIVING A BRUSHLESS MOTOR

(75) Inventors: Mikihiro Hiramine, Kariya (JP); Masahiro Miyata, Kariya (JP)

(73) Assignee: Denso Corporation, Kariya (JP)

( * ) Notice: Subject to any disclaimer, the term of this patent is extended or adjusted under 35 U.S.C. 154(b) by 201 days.

(21) Appl. No.: 11/019,285

(22) Filed: Dec. 23, 2004

(65) Prior Publication Data

US 2005/0179428 A1 Aug. 18, 2005

(30) Foreign Application Priority Data

Feb. 16, 2004 (JP) ............................. 2004-037947

(51) Int. Cl.
*G08B 21/00* (2006.01)
*G01R 31/00* (2006.01)
*G01R 31/08* (2006.01)

(52) U.S. Cl. ...................... 340/664; 340/648; 324/500; 324/522

(58) Field of Classification Search ................ 340/664, 340/648, 644; 318/364; 324/500, 522, 772; 180/404; 701/41

See application file for complete search history.

(56) References Cited

U.S. PATENT DOCUMENTS

| | | | | |
|---|---|---|---|---|
| 6,148,949 | A * | 11/2000 | Kobayashi et al. | 180/446 |
| 6,223,852 | B1 * | 5/2001 | Mukai et al. | 180/446 |
| 6,459,972 | B1 * | 10/2002 | Kodaka et al. | 701/43 |
| 6,779,626 | B1 * | 8/2004 | Matsuoka et al. | 180/446 |
| 7,040,450 | B1 * | 5/2006 | Nagase et al. | 180/443 |

FOREIGN PATENT DOCUMENTS

JP     A-2003-164159     6/2003

* cited by examiner

*Primary Examiner*—Toan N. Pham
(74) *Attorney, Agent, or Firm*—Posz Law Group, PLC (57) ABSTRACT

A control unit for a brushless motor has an upper-arm current detector for detecting an electric current flowing into an upper-arm switching transistor for driving the brushless motor, and a lower-arm current detector for detecting an electric current flowing into a lower-arm switching transistor. The control unit controls the current that flows into the brushless motor based on the upper-arm current value when it is so determined that the lower-arm current value cannot be detected. The control unit detects abnormal condition in the first current detector based on the upper-arm current value.

10 Claims, 5 Drawing Sheets

APPARATUS FOR DRIVING A BRUSHLESS MOTOR

CROSS REFERENCE TO RELATED APPLICATION

This application is based on and incorporates herein by reference Japanese Patent Application No. 2004-037947 filed on Feb. 16, 2004.

FIELD OF THE INVENTION

This invention relates to an apparatus for driving a brushless motor and, particularly, to a method of detecting an electric current of the brushless motor.

BACKGROUND OF THE INVENTION

As a device for detecting an electric current of a three-phase inverter for controlling a three-phase brushless motor, a resistor voltage drop detector system is proposed. This system detects currents of the phases based on the voltage drops across the current detecting resistors interposed between low DC power source lines and lower-arm side switching transistors in the phases of the three-phase inverter, which is PWM-controlled.

According to the resistor voltage drop detector system, however, when the duty ratio of the lower-arm side switching transistor connected in series with the resistor assumes a small value of less than 30%, i.e., when the duty ratio of the upper-arm side switching transistor assumes a large value of more than 70%, the gate voltage waveform applied to the lower-arm side switching transistor is not often turned onto a sufficient degree. It thus becomes difficult to correctly detect the current of this phase.

In order to solve the above problem, a current detecting device is also proposed in JP-A-2003-164159. This device, when the duty ratio of the lower-arm side switching transistor of one phase assumes a small value making it difficult to detect an electric current, finds the electric current from the sum of currents of the remaining two phases by utilizing such a feature that the sum of currents of three phases (U-phase, V-phase and W-phase) of the brushless motor becomes 0 A.

According to the method of detecting an electric current as proposed in JP-A-2003-164159, abnormal condition cannot often be detected from the estimated electric currents flowing through the remaining two phases in case the duty ratio of the lower-arm side switching transistor of one phase assumes a small value as described above causing an abnormal current to flow through the one phase.

By providing an upper-arm side current detector circuit between the power source and the upper-arm side switching transistor, therefore, it becomes possible to detect an abnormal current flowing when the brushless motor is grounded in a region (duty) where the current cannot be detected by the above resistor voltage drop detector system.

In case the upper-arm side current detector circuit becomes abnormal, however, it becomes quite difficult to detect the abnormal current, and the motor and the peripheral equipment undergo malfunctioning.

SUMMARY OF THE INVENTION

In view of the above problems, it is an object of the present invention to provide an apparatus for driving a brushless motor, which is capable of reliably detecting abnormal condition in an upper-arm side current detector circuit.

According to an apparatus for driving a brushless motor, a first switching transistor and a second switching transistor are connected to a brushless motor in series. A first current detector circuit detects a first current in the first switching transistor, and a second current detector circuit detects a second current in the second switching detector circuit. An abnormal condition detector detects abnormal condition in the first current detector circuit based on a first current value. An abnormal current due to short circuit fault of motor terminals, in the area where the abnormal current cannot be detected by the second current detector circuit can be detected by the first current detector circuit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

In the following embodiments, an apparatus for driving a brushless motor capable of detecting abnormal condition in an upper-arm side (first switching transistor-side) current detector circuit is realized to detect abnormal condition when the upper-arm side electric current (first electric current) is not within a predetermined range.

First Embodiment

Figure 1:
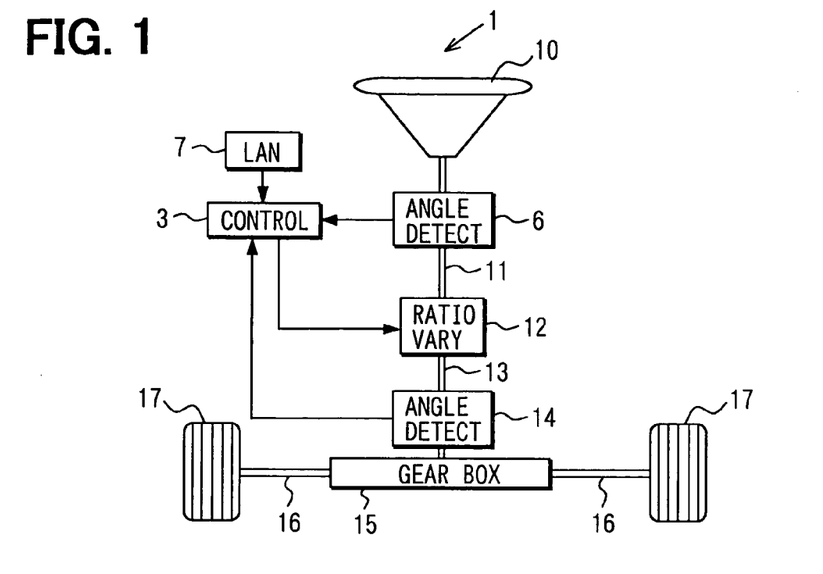
FIG. 1 is a schematic diagram illustrating a transmission ratio variable control apparatus according to a first embodiment of the invention.

An apparatus for driving a brushless motor according to the first embodiment is applied to a transmission ratio variable steering apparatus 1 of a vehicle, although not limited thereto, as shown in FIG. 1.

A steering wheel 10 of a vehicle is connected to an upper end of an input shaft 11. Further, a lower end of the input shaft 11 is connected to an upper end of an output shaft 13 via a transmission ratio varying unit 12. A pinion that is not shown is provided at the lower end of the output shaft 13, and is in mesh with a rack 16 in a steering gear box 15. An electric power assisted steering apparatus (not shown) is provided in the steering gear box 15. Steered tire wheels 17 are connected to both ends of the rack 16 via tie rods and arms that are not shown.

The input shaft 11 is provided with a steering angle sensor 6 for detecting the steering angle of the steering wheel 10. The output shaft 13 is provided with an output angle sensor 14 constructed with a resolver for detecting the steered angle of the steered tire wheels 17. The output angle sensor 14 may be provided in the transmission ratio varying unit 12.

The steering angle of the input shaft 11 and the rotational angle of the output shaft 13 detected by the steering angle sensor 6 and the output angle sensor 14, are input to a transmission ratio control unit 3. The transmission ratio control unit 3 further receives a vehicle speed signal and an engine rotational speed signal from a vehicle-mounted LAN (local area network) 7. The transmission ratio control unit 3 produces a control signal for controlling the transmission ratio varying unit 12.

The transmission ratio varying unit 12 is constructed with a motor 4 which is a known brushless motor and a reduction mechanism 5, and permits the motor 4 to rotate based on the signals from the steering angle sensor 6 and the vehicle-mounted LAN 7 to vary the rotational angle of the output shaft 13.

In the above steering mechanism, first, upon receipt of a vehicle speed signal from the vehicle-mounted LAN 7 and the steering angle detected by the steering angle sensor 6, the transmission ratio control unit 3 calculates a target rotational angle of the output shaft 13 based on these data. A motor control instruction based on the target rotational angle is output as a PWM signal (pulse width modulation signal) to the transmission ratio varying unit 12 from the transmission ratio control unit 3.

The motor 4 in the transmission ratio varying unit 12 is driven by the motor control instruction to apply, to the steered tire wheels 17, a steered angle corresponding to a rotational angle obtained by adding the rotational angle of the steering wheel 10 to the target rotational angle of the output shaft 13. The transmission ratio control unit 3 is so fed back as to estimate the real steered angle of the steered tire wheels 17 from the output angle sensor 14 and to apply, to the steered tire wheels 17, the steered angle that reliably corresponds to the target rotational angle.

Upon detecting abnormal condition in the transmission ratio varying unit 12, the transmission ratio control unit 3 provides an instruction to a solenoid drive circuit 32 (FIG. 2) to discontinue the supply of current to the solenoid coil 2. Therefore, the input shaft 11 and the output shaft 13 are coupled together enabling the operation to be carried out without through the transmission ratio varying unit 12.

Figure 2:
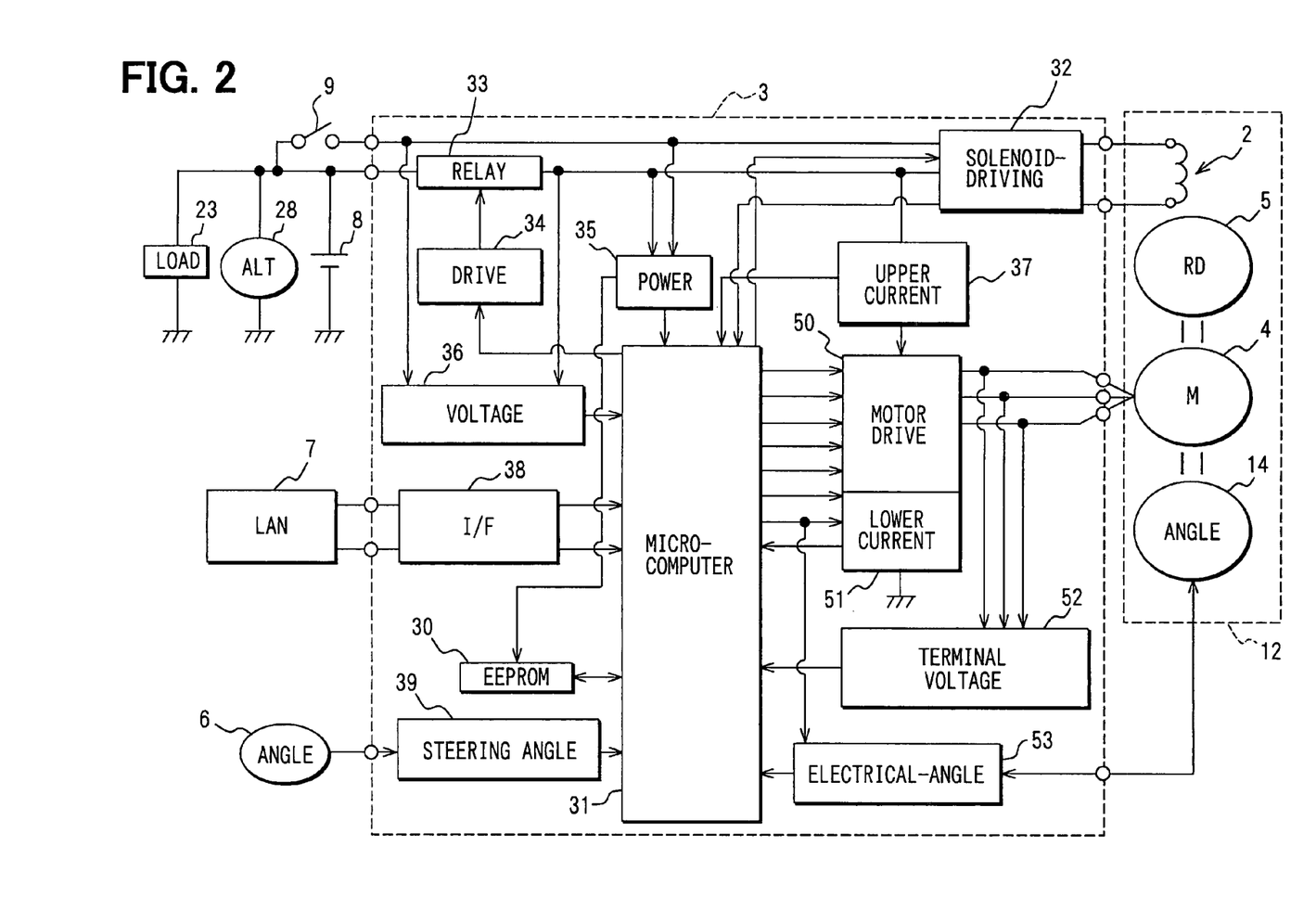
FIG. 2 is a circuit diagram illustrating the transmission ratio variable control apparatus shown in FIG. 1.

As shown in FIG. 2, a solenoid coil 2 is connected to the solenoid drive circuit 32 in the transmission ratio control unit 3, and generates an electromagnetic force upon receiving a drive signal from the solenoid drive circuit 32 to connect the input shaft 11 and the output shaft 13 together or to disconnect them.

Based on the data from the steering angle sensor 6 and the vehicle-mounted LAN 7, the transmission ratio control unit 3 controls the current flowing into the solenoid coil 2 and the driving of the motor 4. The control unit 3 is constructed with a microcomputer 31, the solenoid drive circuit 32, a relay 33, a relay drive circuit 34, a power source circuit 35, a voltage detector circuit 36, an upper-arm side current detector circuit 37 (first current detector), a communication I/F (interface) 38, a steering angle detector circuit 39, a motor drive circuit 50, a lower-arm side current detector circuit 51 (second current detector), a motor terminal voltage detector circuit 52 (applied voltage detector), and an electric angle detector circuit 53 (rotational angle detector).

Figure 3:
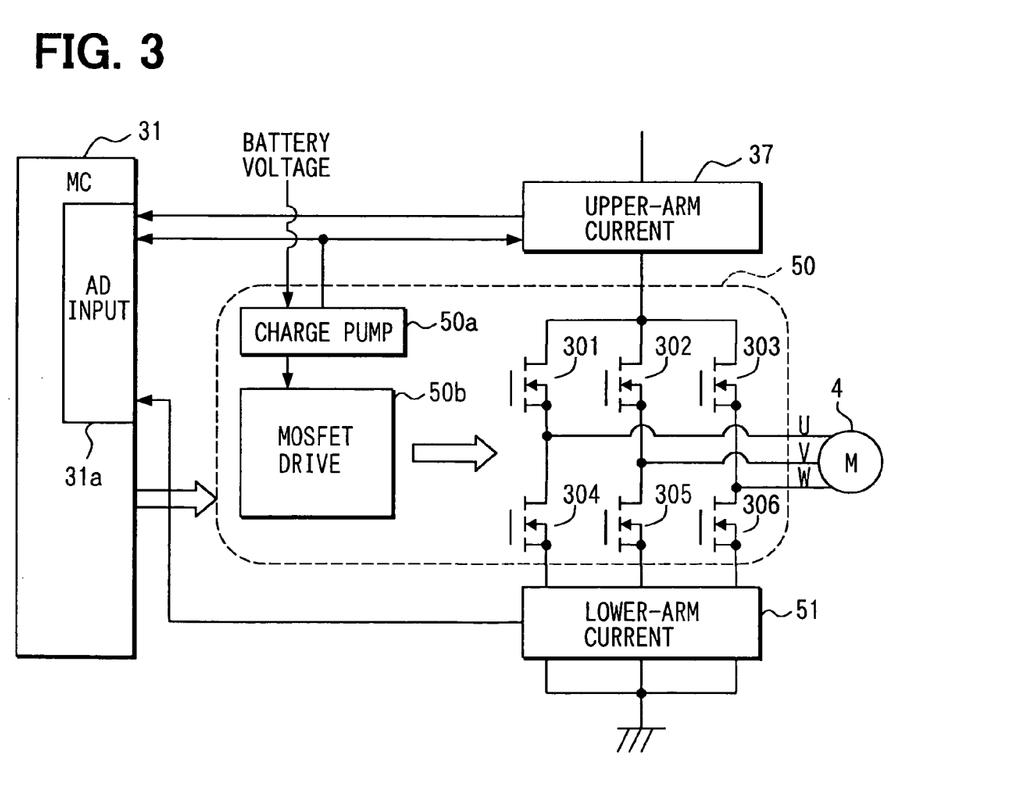
FIG. 3 is a circuit diagram illustrating a motor drive circuit in the first embodiment.

The motor drive circuit 50 has, as shown in FIG. 3, an upper-arm side transistor 301 to 303 and a lower-arm side transistor 304 to 306 connected in series to each other and in parallel to the battery for each phase of the brushless motor 4.

The microcomputer 31 calculates the currents that flow into the solenoid coil 2 and into the motor 4 based on the data from the steering angle sensor 6 and the vehicle-mounted LAN 7, and produces a control signal based on the calculated values, and is constructed with the microcomputer 31 and known ROM and RAM that are not shown. Various operation processing based on the signals input to the microcomputer 31 and control signal output processing of the microcomputer 31 for the peripheral circuits, are executed based on the control programs and data stored in the ROM or the RAM. The microcomputer performs determination, control, abnormal condition detection and current estimation.

The relay 33 is provided between the battery 8 and the solenoid drive circuit 32. Upon being turned on, the relay 33 connects the battery 8 to the solenoid drive circuit 32. Upon being tuned off, the relay 33 disconnects the solenoid drive circuit 32 from the battery 8. The relay 33 is turned on or off by the relay drive circuit 34 that is operated by a control signal from the microcomputer 31.

The power source circuit 35 is connected to the battery 8 via an IG switch 9, and supplies an electric current to the microcomputer 31 from the battery 8. The voltage detector circuit 36 detects a voltage of the battery 8, and provides the detected value to the microcomputer 31. The upper-arm side current detector circuit 37 supplies an electric current to the upper-arm side transistor in the motor drive circuit 50 from the battery 8, detects a current value, and inputs the detected current value to the microcomputer 31.

The communication I/F 38 converts the vehicle speed signal and the engine rotational speed signal from the vehicle-mounted LAN 7 into those of a form that can be processed by the microcomputer 31, and inputs the thus converted vehicle speed signal and the engine rotational speed signal to the microcomputer 31. In order to suppress unstable operation of the vehicle, further, the communication I/F 38 receives, from the vehicle-mounted LAN 7, a signal for forcibly varying the target rotational angle and provides the signal to the microcomputer 31. The signal for forcibly varying the target rotational angle is sent to the communication I/F 38 when, for example, the steered tire wheels 17 are slipping.

The steering angle detector circuit 39 converts a signal from the steering angle sensor 6 into a signal of a form that can be recognized by the microcomputer 31, and provides the thus converted steering angle signal to the microcomputer 31.

The electric angle detector circuit 53 converts the rotational angle (electric angle) of the motor 4 connected to the reduction mechanism 5 through the output shaft 13 and detected by the output angle sensor 14 into a form that can be processed by the microcomputer 31, and provides the thus converted rotational angle signal to the microcomputer 31.

The motor terminal voltage detector circuit 52 detects voltages of six switching transistors 301 to 306 in the motor drive circuit 50 shown in FIG. 3, and provides the detected voltage values to the AD input unit 31*a* of the microcomputer 31. The AD input unit 31a is incorporated in the microcomputer 31, puts the input signals to the A/D (analog/digital) conversion, and appis the converted data for use in the calculation by the microcomputer 31.

Referring to FIG. 3, the motor drive circuit 50 is constructed as a known three-phase inverter, in which the switching transistors 301 to 306 corresponding to the terminals of the motor coils U, V and W are so arranged as to form a known H-type bridge circuit in a form of including a flywheel diode (not shown) that forms an induction current type by-pass accompanying the switching of the coils U, V and W. In response to drive signals from the microcomputer 31, the switching transistors 301 to 306 are controlled for their duty by PWM to drive the motor 4.

The drive of the motor 4 is controlled in a form in which a duty ratio control sequence due to PWM signals from the MOSFET drive circuit 50b is superposed on a sequence for changing over the currents of the phases U, V and W. If the switching transistors 301 to 306 are switch-driven by using rotational angle signals from the output angle sensor 14 and PWM signals from the MOSFET drive circuit 50b, a PWM current can be selectively fed to the coils of phases that take part in supplying currents.

The switching transistors 301 to 303 are arranged to correspond to the U-phase, V-phase and W-phase, successively, and represent the first switching transistors which are upper-arm side switching transistors. Further, the switching transistors 304 to 306 are, successively, arranged to correspond to the U-phase, V-phase and W-phase, and represent the second switching transistors which are also lower-arm side switching transistors.

From the battery voltage, a charge pump circuit 50a forms a voltage for switch-driving the switching transistors 301 to 306 through a MOSFET drive circuit 50b.

The upper-arm side current detector circuit 37 detects currents flowing into the three upper-arm side switching transistors 301 to 303 in the motor drive circuit 50, and provides the detected current values to the AD input unit 31a of the microcomputer 31. The lower-arm side current detector circuit 51 detects currents flowing into the three lower-arm side switching transistors 304 to 306 in the motor drive circuit 50, and provides the detected current values to the AD input unit 31a of the microcomputer 31. The current detector units in the upper-arm side current detector circuit 37 and in the lower-arm side current detector circuits 51 are constructed with resistors. By measuring voltages across the resistors, the current values can be detected.

Figure 4:
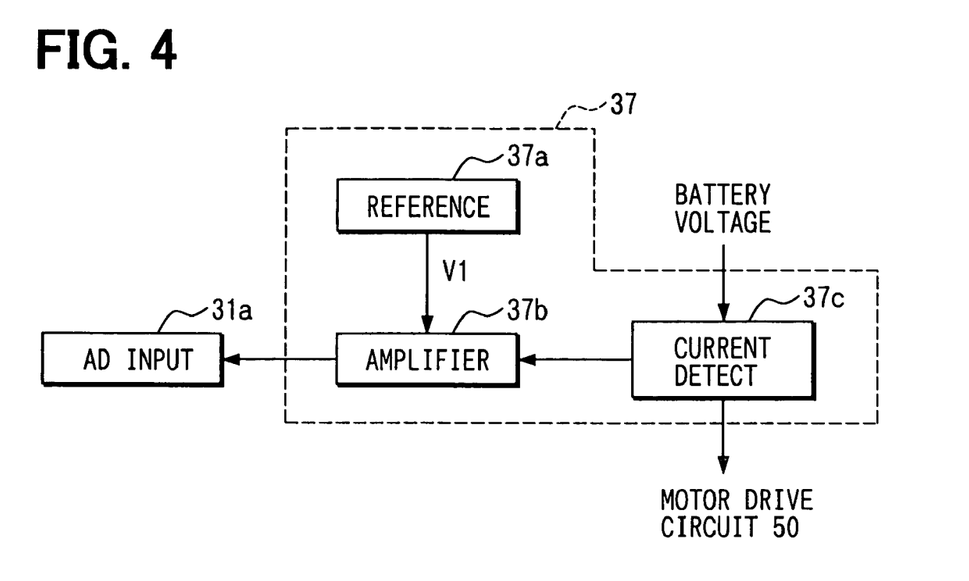
FIG. 4 is a block diagram illustrating an upper-arm side current detector circuit in the first embodiment.

FIG. 4 is a block diagram illustrating the upper-arm side current detector circuit 37 in detail. A reference voltage generator unit 37a is constructed with a known offset voltage generator circuit including an operational amplifier. A signal amplifier unit 37b is constructed with a known circuit including an operational amplifier. A voltage value corresponding to a current value detected by a current detector unit 37c is superposed on a reference voltage V1 formed by the reference voltage generator unit 37a through the signal amplifier unit 37b, and is input to the AD input unit 31a of the microcomputer 31.

As for the operation of the transmission ratio variable steering apparatus 1, the microcomputer 31 provides a control signal to the solenoid drive circuit 32 which, then, supplies a current to the solenoid 2 to liberate the input shaft 11 and the output shaft 13 from each other. The motor 4 is rotated by the signals from the steering angle sensor 6 and the vehicle-mounted LAN 7, whereby the rotational force of the motor 4 is transmitted to the output shaft 13 via the reduction mechanism 5.

The torque consisting of a torque of the output shaft 13 to which the rotational force of the motor 4 is transmitted and a steering force added by the driver, is detected by the torque sensor of the electric power assisted steering apparatus, and the steered angle of the steered tire wheels 17 is varied by the electric motor in the electric power assisted steering apparatus that is not shown.

The microcomputer 31 performs abnormal condition detection processing as described below.

(Abnormal Condition Detection Processing 1)

Figure 6:
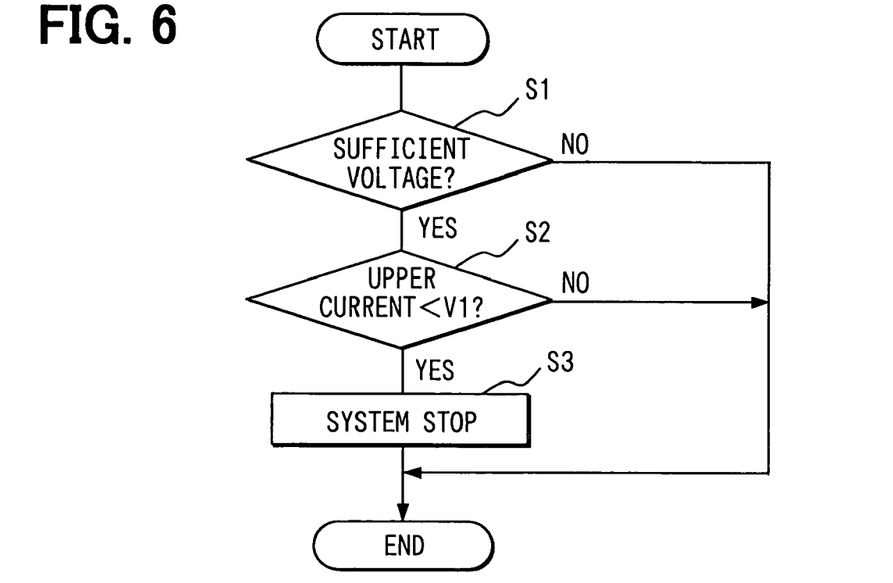
FIG. 6 is a flowchart illustrating one abnormal condition detection processing in the first embodiment.

The processing in the first embodiment shown in FIG. 6 is repetitively effected by a control program together with other processing while the transmission ratio variable steering apparatus 1 is in operation.

First, it is checked at step S1 if there is supplied a voltage sufficient for operating the upper-arm side current detector circuit 37. If the voltage sufficient for the operation has not been supplied (S1: NO), the abnormal condition detection processing ends.

Figure 5:
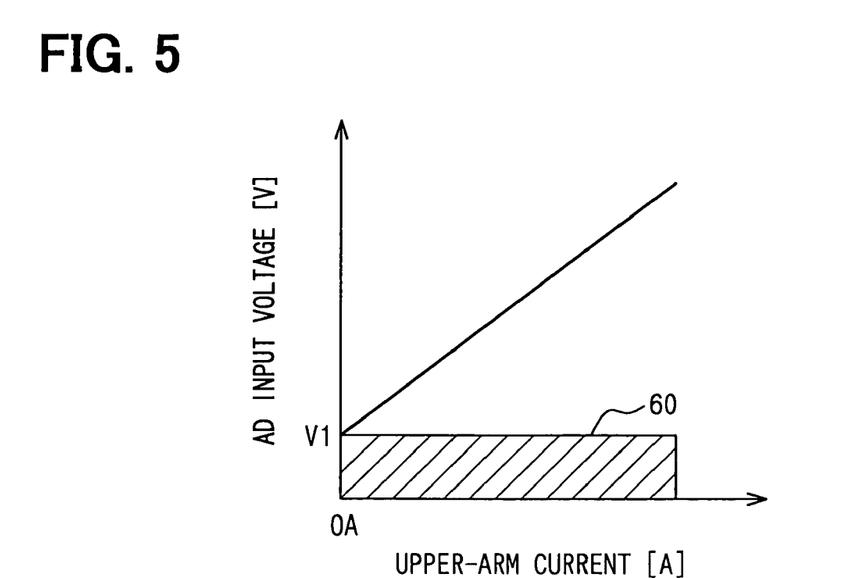
FIG. 5 is a characteristics diagram illustrating a relationship between a current value and a voltage after the A/D conversion in the upper-arm side current detector circuit.

When a voltage sufficient for operating the upper-arm side current detector circuit 37 is supplied (S1: YES), on the other hand, an upper-arm side current detection value output from the upper-arm side current detector circuit 37 (i.e., a voltage value corresponding to a current value) is put to the A/D conversion through the AD input unit 31a, and a detected AD value which is a result thereof is compared with the reference voltage V1. When the detected AD value is greater than the reference voltage V1 (S2: NO) shown in FIG. 5, it is so determined that the operation of the upper-arm side current detector circuit 37 is normal, and the processing ends.

As a result of comparison, on the other hand, when the detected AD value is smaller than the reference voltage V1 (S2: YES), it is so determined that the operation of the upper-arm side current detector circuit 37 is abnormal. In this case, a system stop processing is executed such as bringing the motor into a stop (S3).

Second Embodiment (Abnormal Condition Detection Processing 2)

Figure 7:
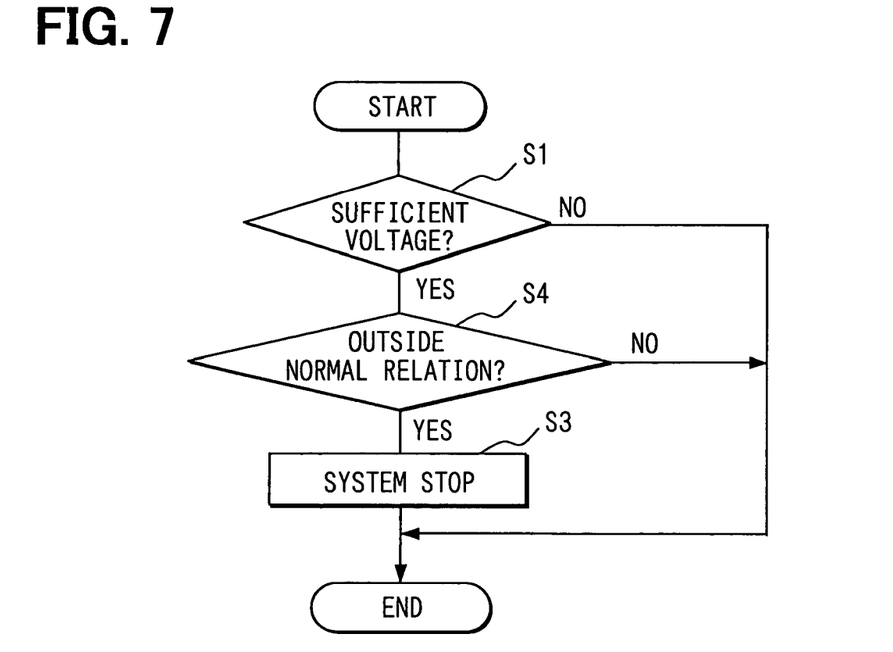
FIG. 7 is a flowchart illustrating another abnormal condition detection processing in a second embodiment of the invention.

The processing in the second embodiment shown in FIG. 7 is repetitively effected.

First, it is checked if there is supplied a voltage sufficient for operating the upper-arm side current detector circuit 37. If the voltage sufficient for the operation is not supplied (S1: NO), the abnormal condition detection processing ends.

When a voltage sufficient for operating the upper-arm side current detector circuit 37 (S1: YES) is supplied, on the other hand, an upper-arm side current detection value output from the upper-arm side current detector circuit 37 (i.e., a voltage value corresponding to a current value) and a lower-arm side current detection value output from the lower-arm side current detector circuit 51, are put to the A/D conversion through the AD input unit 3a. The upper-arm side AD value Va which is a result thereof is compared with the lower-arm side AD value Vb. When a relationship between the two is within a predetermined range (S4: NO), it is so determined that the operation of the upper-arm side current detector circuit 37 is normal, and the processing ends.

As a result of comparison, on the other hand, when the relationship between the two does is outside the predetermined range (S4: YES), it is so determined that the operation of the upper-arm side current detector circuit 37 is abnormal.

Then, the system stop processing is executed such as bringing the motor into a stop (S3).

The value of the lower-arm side current is equal to the value of the upper-arm side current from which are subtracted the currents consumed through the current passage including the upper-arm side switching transistors 301 to 303, motor 4, and lower-arm side switching transistors 304 to 306. Namely, the voltage value corresponding to the lower-arm side current becomes equal to the voltage value corresponding to the upper-arm side current from which is subtracted a voltage drop through the resistance included in the current passage. Therefore, the following methods can be exemplified for determining whether a relationship between the upper-arm side current value (upper-arm side AD value Va) and the lower-arm side current value (lower-arm side AD value Vb) is a predetermined range.

Figure 8:
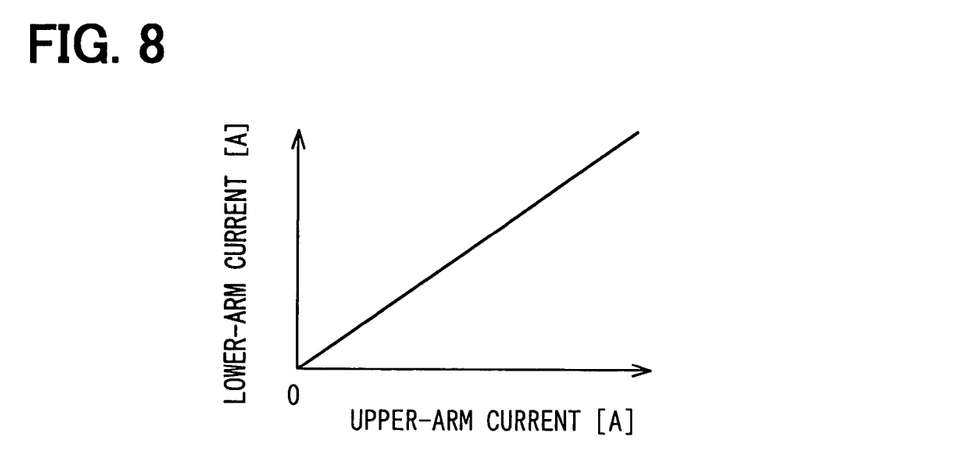
FIG. 8 is a characteristic diagram illustrating a relationship between an upper-arm side current and a lower-arm side current in the second embodiment.

(1) A difference between Va and Vb is within a predetermined range.
(2) The value Vb corresponding to Va is stored in the EEPROM 30 in advance as map data, and a difference between Vb calculated from the map data and the lower-arm side AD value Vb is within a predetermined range.
(3) Vb is defined as a function of Va (FIG. 8), the value Vb corresponding to Va is stored in the EEPROM 30 in advance as functional map data, and a difference between Vb calculated from the functional map data and the lower-arm side AD value Vb is within a predetermined range.
(4) A ratio of Va and Vb is within a predetermined range (FIG. 8).

Third Embodiment (Abnormal Condition Detection Processing 3)

Figure 9:
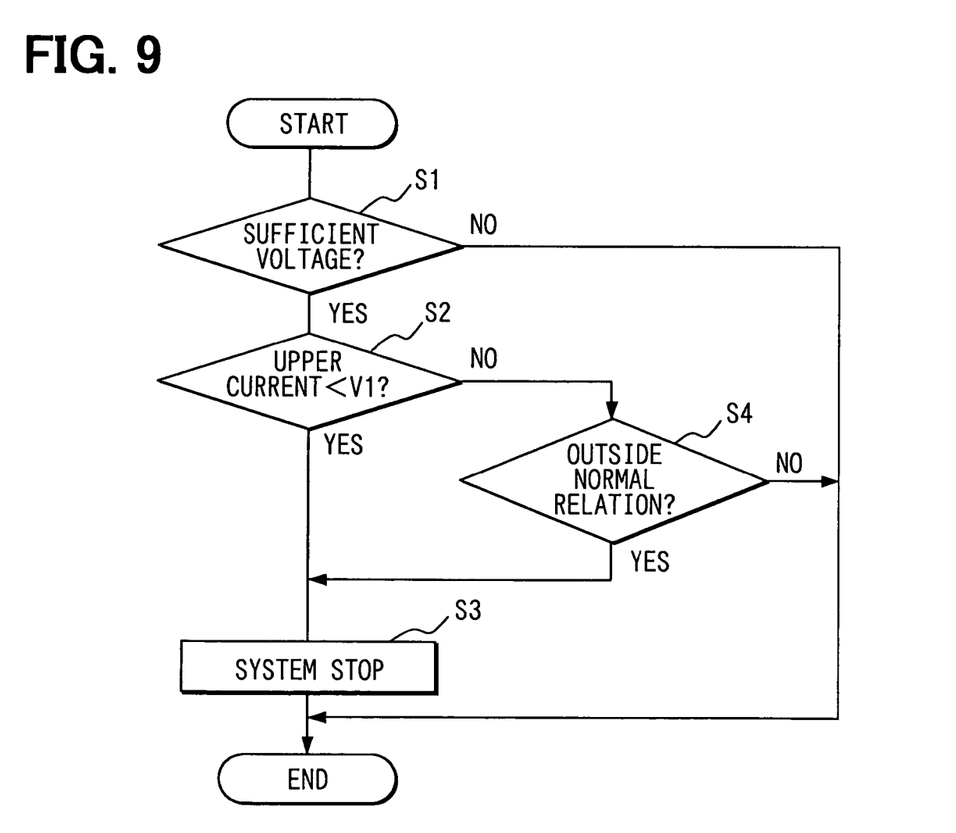
FIG. 9 is a flowchart illustrating a further abnormal condition detection processing in a third embodiment of the present invention.

This processing in the third embodiment shown in FIG. 9 is repetitively effected together with other processing while the transmission ratio variable steering apparatus 1 is in operation.

First, it is checked if there is supplied a voltage sufficient for operating the upper-arm side current detector circuit 37. If the voltage sufficient for the operation is not supplied (S1: NO), the abnormal condition detection processing ends.

When a voltage sufficient for operating the upper-arm side current detector circuit 37 is supplied (S1: YES), on the other hand, an upper-arm side current detection value output from the upper-arm side current detector circuit 37 (i.e., a voltage value corresponding to a current value) is put to the A/D conversion through the AD input unit 31a, and a detected AD value which is a result thereof is compared with the reference voltage V1. When the detected AD value is greater than the reference voltage V1 (S2: NO), the routine proceeds to next step (S4).

As a result of comparison, on the other hand, when the detected AD value is smaller than the reference voltage V1 (S2: YES), it is so determined that the operation of the upper-arm side current detector circuit 37 is abnormal. Then, a system stop processing is executed such as bringing the motor into a stop (S3).

When the detected AD value is greater than the reference voltage V1 (S2: NO), the lower-arm side current detection value output from the lower-arm side current detector circuit 51 (i.e., a voltage value corresponding to a current value) is put to the A/D conversion through the AD input unit 31a. The upper-arm side AD value Va which is the result thereof is compared with the lower-arm side AD value Vb. When a relationship between the two is in a predetermined range (S4: NO), it is so determined that the operation of the upper-arm side current detector circuit 37 is normal, and the processing ends.

As a result of comparison, on the other hand, when the detected AD value is smaller than the reference voltage V1 (S4: YES), it is so determined that the operation of the upper-arm side current detector circuit 37 is abnormal. Then, the system stop processing is executed such as bringing the motor into a stop (S3).

Here, the method of determining whether the relationship between the upper-arm side AD value and the lower-arm side AD value is in a predetermined range is the same as that of the second embodiment, and is not described here again.

Fourth Embodiment (Abnormal Condition Detection Processing 4)

First, the upper-arm side current detection value detected by the upper-arm side current detector circuit 37 is put to the A/D conversion through the AD input unit 31a to find the upper-arm side AD value Va. The upper-arm side AD value Va is multiplied by a predetermined conversion coefficient determined by the circuit construction of the upper-arm side current detector circuit 37 to find an upper-arm side detected current value Ia.

Next, a motor terminal voltage detected by the motor terminal voltage detector circuit 52 is put to the A/D conversion through the AD input unit 31a to find a motor terminal voltage Vm. Further, an angular velocity ω which is the amount of change of electric angle per a unit time is found from the electric angle that is detected from the electric angle detector circuit 53 through the AD input unit 31a. An actual motor current value (i.e., upper-arm side estimated current value) Im is found from the following formula (1).

$$\omega = (Vm - Im \times R)/K \qquad (1)$$

where R is a resistance including an internal resistance of the motor 4 and a resistance in the upper-arm side current passage in the motor drive circuit 50, K is a counter electromotive constant of the motor, which are determined depending upon the motor and the motor drive circuit.

The upper-arm side detection current value Ia is compared with the upper-arm side estimated current value Im. When a difference between the two is outside a predetermined range, it is so determined that the operation of the upper-arm side current detector circuit 37 is abnormal. Then, the system stop processing is executed such as bringing the motor into a stop.

In the above embodiments, the electric current flowing into the brushless motor 4 may be controlled based on the upper-arm current value detected by the current detector circuit 37 and on the lower-arm current value detected by the current detector circuit 51. However, the electric current that flows into the brushless motor 4 may be controlled based on the upper-arm current value when the lower-arm current value cannot be detected. When the duty ratio applied to the switching transistor 304–306 is smaller than a predetermined value, it may be determined that the lower-arm current detector circuit 51 cannot detect the current value.

The present invention is not limited to the above embodiments, but may be modified in many other ways without departing from the spirit of the invention.

What is claimed is:

1. An apparatus for driving a brushless motor comprising:
a first switching transistor connected to the brushless motor;
a second switching transistor connected to the brushless motor and in series with the brushless motor;
first current detector means for detecting an electric current flowing into the first switching transistor for driving the brushless motor;
second current detector means for detecting an electric current flowing into the second switching transistor for driving the brushless motor; and
abnormal condition detector means for detecting abnormal condition in the first current detector means based on a first current value.

2. An apparatus for driving a brushless motor according to claim 1, further comprising:
determining means for determining whether a voltage sufficient to detect the first current value is supplied to the first current detector means,
wherein the abnormal condition detector means performs abnormal condition detection only when the voltage to the first current detector means is sufficient.

3. An apparatus for driving a brushless motor according to claim 1, wherein the abnormal condition detector means detects abnormal condition when the first current value is outside a predetermined range.

4. An apparatus for driving a brushless motor according to claim 1, wherein the abnormal condition detector means compares a relationship between the first current value and the second current value with a predetermined relationship, and detects abnormal condition when a difference between the two relationships are outside the predetermined range.

5. An apparatus for driving a brushless motor according to claim 1, wherein the abnormal condition detector means detects abnormal condition when the first current value is outside the predetermined range or when a difference between the first current value and the second current value is outside the predetermined range as a result of comparing the two relationships.

6. An apparatus for driving a brushless motor according to claim 1, wherein:
the first current detector means includes a resistor and detects a voltage generated across the resistor as the first current value; and
the abnormal condition detector means detects abnormal condition when the voltage detected is outside the predetermined range.

7. An apparatus for driving a brushless motor according to claim 6, wherein the abnormal condition detector means detects abnormal condition when the voltage that is generated is lower than a voltage that is generated across the resistor when the first current value is zero.

8. An apparatus for driving a brushless motor according to claim 1, wherein the abnormal condition detector means includes:
applied voltage detector means for detecting a voltage applied to the brushless motor;
rotational angle detector means for detecting a rotational angle of the brushless motor; and
current estimating means for estimating a current value flowing into a wiring between a power source and the brushless motor based on a wiring resistance among the applied voltage, the power source, the rotational angle and the brushless motor, wherein
the abnormal condition detector means compares a value estimated by the current estimating means with the first current value, and detects abnormal condition when the difference between the two is outside the predetermined range.

9. An apparatus for driving a brushless motor according to claim 1, wherein the brushless motor is provided in a transmission ratio variable steering apparatus that includes an input shaft connected to a steering wheel, an output shaft connected to a steered tire wheel, and a transmission ratio varying mechanical unit for varying a rotational angle of the output shaft relative to a rotational angle of the input shaft by the brushless motor.

10. An apparatus for driving a brushless motor according to claim 1, wherein:
the first switching transistor is connected to an output of a DC positive-side potential constituting a three-phase inverter circuit for driving the brushless motor being operated by a pulse width modulation system using rectangular waves of which the duty ratio of pulse width is variable;
an electric current flowing into the brushless motor is controlled based on the first current value detected by the first current detector means and on the second current value detected by the second current detector means;
a current that flows into the brushless motor is controlled based on the first current value when the second current value cannot be detected; and
the determining means determines that the second current detector means cannot detect the current value when the duty ratio applied to the second switching transistor is smaller than a predetermined value.

* * * * *